United States Patent Office 3,514,861
Patented June 2, 1970

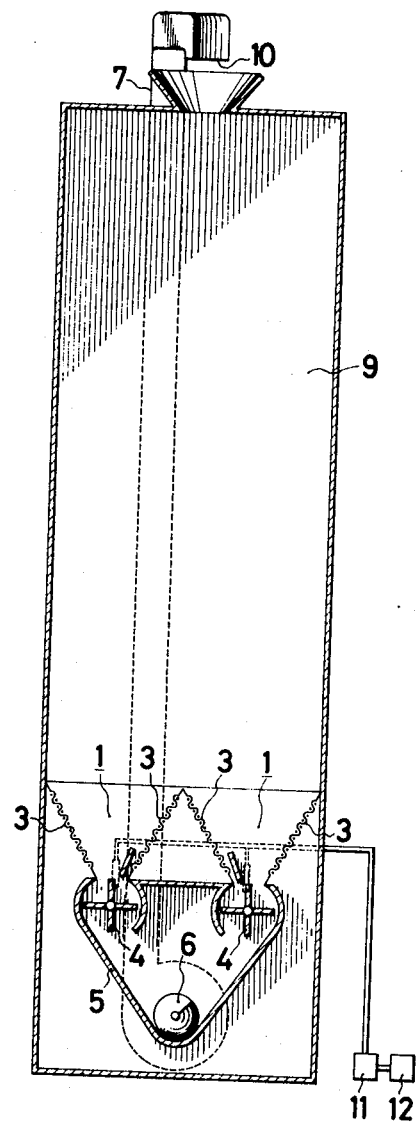

3,514,861
CIRCULATING-GRAIN DRYING APPARATUS
Toshihiko Satake, 2–38 Nishihonmachi, Saijocho,
Kamo-gun, Hiroshima, Japan
Filed May 9, 1968, Ser. No. 727,891
Int. Cl. F26b 3/00
U.S. Cl. 34—33    4 Claims

ABSTRACT OF THE DISCLOSURE

A circulated grain drying apparatus wherein a grain drying chamber is provided in which rough rice grains flow downwardly at a high speed and are dried to a moisture content so that the rice grain is not broken due to the drying operation; and a tempering tank is installed on the grain drying chamber, having a volume more than five times as large as the volume of the grain drying chamber.

Field of invention

The present invention relates to a grain drying apparatus, and more particular it relates to a circulating-grain, drying apparatus of tempering type.

Background

As is generally known by those skilled in the art, rough rice is easy to dry up, but is extremely susceptible to breakage or sun-checking in its structure. Therefore, when rough rice is directly dried by exposure to the sun, the rice kernels will crack or break down in large quantities by shrinkage stresses, so that rough rice grains have been conventionally dried gradually in the shade.

Also, in the artificial drying operation, rough rice grains, when exposed to a large quantity of hot air with high temperature, will be immediately dried up, but small fractures or sun-checks will be produced in large quantities of the rice grains. It is, therefore, advisable to dry rice grains by exposure to a very gentle wind of air having a temperature of about 30° C. to 35° C. and moving at a speed of 0.4 m.³/sec. (per 1 ton of rough rice).

However, even under a gentle condition as described rice kernels having sun-checks appear in about 5% to 10% of the rice. In view of the above fact it will be understood that the rice grain is extremely susceptible to breakage or sun-checking due to the drying operation.

However, a grain-drying method has been developed heretofore, in which rough rice susceptible to breakage or sun-checking as described just above may be dried by exposure to a hot and strong air at more than 45° C. and moving at a speed of 3 m.³/sec. (per 1 ton of rough rice). Such grain-drying method is known by the name of "Interruption drying method" in which the rough rice grains are intermittently exposed to drying air so that the rice grains are dried stepwise. It has been already proved by experiments that the intermittently drying method as described just above is superior in drying efficiency as well as in quality of dried rice grain to conventional method in which the rice grains are continuously exposed to drying air until the moisture content thereof may be reduced to a fixed moisture content suitable for storage, but this method has not been successfully employed to practical use for some reason or other.

In September, 1957, Wheat Research Society in Japan published a booklet entitled "Draft for Cereals" with a view to introduce to Japan the advanced techniques prevailing in the concerned industries in the United States. On pages 40 through 51 of said booklet is disclosed a method of drying rough rice, according to which method the rough rice grains come down in a cascade in a reel (cylindrical dryer) rotating about a horizontal axis and these rice grains are subjected to intermittent drying treatments 5 times in total, i.e. first for 6 minutes, then 6 minutes, then 7 minutes, then 4 minutes and lastly 8 minutes, totalling 31 minutes in sum, by using drying air at a velocity of about 4 meters per second at 65.5° C., and between each drying treatment the rough rice grains are transferred to another container and subjected therein to 20-hour tempering treatment to thereby accomplish drying of the unhulled rice grains.

In August, 1960, the Food Storage Association in Japan published a booklet entitled "A Study on Humidity Control and Storage of Unhulled and Polished Rice in the United States." It is described in this booklet that between passes through the drying machine the rice grains are stored in a storage bin where equilibrium of moisture is attained, and that the tempering time should be 4 hours when the rice temperature is 40° C. and 6 hours when the rice temperature is 25° C., and that this determination of optimum tempering time is based on the degree of loss of head rice. It is also reported therein that in case drying was effected by a hot air of 43° C. for about 5 minutes, the tempering treatment should be conducted under about 30-minute cessation of operation of the drying machine for obtaining good results.

In July, 1964, Prof. and Doc. of Agriculture Kazuo Nagato of Nagoya University reported in "Improvements of Rice and Barley" that if the hull of rough rice grain is first dried at 40° C. for about one hour, it may then be preferably left packed in a vinyl bag for about 4 hours whereby moisture in its seed proper will be transferred to the hull.

In June, 1965, Director Komatsu of the National Selling Companies' Federation, after a tour of technical inspection of drying machines in the United States, reported that in the United States, that the operation of transferring rough rice between drying passes into a storage bin to accumulate rough rice therein is called "tempering," that in the Research Institute of U.S. Department of Agriculture the rough rice was dried from 20% to 12% moisture with hot airs at 65.5° C., 51.6° C. and 32.2° C. in 30 minutes total drying time in passes with the tempering time of 4 to 5 hours, that in the experimental rice farm of Louisiana State University the experiments have been continued by using pass time of 15 minutes, hot air of 85° C. and wind velocity of 100 to 150 ft./min., and that in an experimental rice farm of the Agricultural College of Texas, drying of rough rice has been experimentally conducted by using hot air of 65° C. and tempering time of 12 to 24 hours. In conclusion, Mr. Komatsu asserts extremely effective results by intermittent drying.

A rice drying machine was imported from Italy to the University of California in 1927, the experimental results of which are shown in the Bulletin 541 published by the University of California in 1932. Said rice drying machine comprises three drier stands (each 89.4 bushels); three 150-bushel, hopper-bottom bins, one located on each drier stand; said drier stands each consisting of two large drying chambers (each 44.7 bushels) each of which in turn consists of three smaller erect drying chambers (each 14.9 bushels) assembled together; and each of said smaller drying chambers having a thickness of $$\frac{5+6}{2} \text{ inches}$$

(0.14 m.) a width of 40 inches (1.016 m.), and a height of 12 ft. and 6 inches (3.81 m.). The three drier stands are arranged in series and rough rice grains are carried on three grain elevators to be passed successively through said three drier stands and dried. However, this drying machine is not of a single-unit circulation system as will later be described in more particular, but of a lengthy complex-unit structure, so that it requires a wide space for its installation. Further, volume ratio of the tempering bin (hopper-bottom bin) to the drying chambers is as small as 150 bushels: 14.9×6 bushels=1.69:1. It is therefore impossible with this drying machine to attain tempering effect with high efficiency as achieved in the present invention. It is reported in this bulletin, therefore, that the results of avrious experiments conducted at the temperature up to 180° C. showed that the tempering-drying process must be conducted slowly over a long time with low-temperature air of less than 100° F. (38° C.) which is the safety limit temperature for avoiding the sun-checking of rice grain.

Summary

In spite of the fact that various tests and experiments have since long been carried on about intermittent drying as described above, no successful attainment as a commercialized drying apparatus of high efficiency has been made. This is attributable to misconception of intrinsic characters of tempering and to lack of knowledge, and hence glaring misunderstanding, about the ratio in volume of the tempering bin to the drying chamber since there is no established orientation for pursuance of the research objectives.

Prior to the application of the present invention, "tempering" was conceived to mean control of moisture distribution within the seed proper of rough rice, namely humidity equilibrium in the seed proper. Therefore, in the known techniques, the tempering of humidity equilibrium in the seed proper of rough rice has been conducted for an extremely long time with a few exceptions and it has also been a common practice to make the tempering in a still stored condition.

The present inventor defined the tempering as a practice in which a relatively dried hull of partially dried grain sucks moisture out from a seed proper thereof to such an extent that will permit next drying operation, without being wedded merely to moisture equilibrium in the seed proper of rough rice.

Such idea is not found at all in any prior literature. According to this new idea, every drying operation is conducted within the range of equilibrium moisture content (this equilibrium moisture content is a constant value obtained when a material is dried by applying air of a constant temperature and a constant humidity) of the hull of rough rice, and moisture of the seed proper of rough rice is continuously drawn out by the relatively dried hull which has not yet reached equilibrium moisture content to thereby dry the seed proper of rough rice. Therefore, numerous tests and experiments have been carried out to obtain an acceptable method for preferentially drying only the hull or the incrustation of rough rice grain, as a result of which it was found possible to more preferentially dry the hull of rice grain by subjecting rough rice to drying air of a high temperature and of a large quantity rather than by subjecting such rice to drying air of a lower temperature and of a smaller quantity. It was also revealed that the highest possible temperature of hot air is such temperature (80° C.) as will heat the rice grain up to 70° C. since the rice grains, if heated above 70° C., will be blasted, and that the velocity of hot air should be within the range in which the grains will not be impeded from flowing down smoothly and the amount of such hot air should be within the range from about 3 m.³/sec. to about 10 m.³/sec. (per 1 ton of rough rice grains). It was thus confirmed that although somewhat affected by variety and quality of rough rice, satisfactory result is obtained by supplying hot air of about 40° C. to about 80° C. for about 3 to 25 minutes in the amount of about 2 m.³/sec. per 1 ton of rough rice grains. Some of said prior literatures mention about drawing out of moisture from rough rice though the hull thereof, but such attempt is nothing but a simple experimentary study completely disregarding the equilibrium moisture content of hulls. Indeed, such attempt requires nearly one hour for drying and as long as 3 to 4 hours for tempering so that it was quite unacceptable as a practical tempering-drying apparatus of circulation type and has not materialized in a practicable form.

According to the present invention, it is desired to increase as much as possible the amount of drying loss of grain in one drying pass so as to realize reduction of construction cost of the drying chamber by forming it in a smallest possible size. Therefore, drying is suspended when the amount of drying loss of grain by drying pass reached the limit within which the rough rice grains produce no checks or cracks (about 2 to 2.5% drying loss in one drying pass), and immediately tempering treatment is conducted. Although the hull of rough rice is preferentially dried, this safety limit against checks or cracks is arrived at before equilibrium moisture content of hull (this is residual moisture content remains under which condition no substantial additional drying proceeds on, after equilibriated with drying air) is attained. However, it was revealed as a result of further researches that if the hull is allowed to stand for a period about 5 times as long as was required for preferentially drying the hull to the safety limit and then said tempering is conducted, the hull absorbs sufficient moisture from the seed proper to undergo next drying pass without producing any checks or cracks.

Further, in the tempering operation for allowing the hull to draw out moisture from the seed proper while flowing rough rice down through the tempering bin, the inventor found out a fundamental truth that the tempering time is determined according to the size of said bin in case the amount of rice grains flown down is constant. In other words, the tempering time is proportional to capacity of the tempering bin.

The inventor has already mentioned the relationship that assuming the time for drying hulls is 1, the ratio thereto of the time required for wetting the dried hulls enough to undergo next drying pass without impediment should be at least about 5 (if highly efficient drying as in the present invention is conducted by setting said ratio under 5, checks or cracks of rice grain are inevitably produced).

Some examples that justify above-mentioned relationship will be hereinafter shown in connection with the following tables.

Experimental Example No. 1:

TABLE 1.—RESIDUAL MOISTURE CONTENT OF HULL OF ROUGH RICE
[Percent to weight of rough rice]

| Drying time (min.) | Drying air | | | |
| --- | --- | --- | --- | --- |
| | 60° C. 4m.³/sec. ton | 50° C. 4m.³/sec. ton | 40° C. 4m.³/sec. ton | 40° C. 2.5m.³/sec. ton |
| 0 | 4.1 | 3.7 | 3.8 | 3.8 |
| 1 | 3.8 | 3.4 | 3.5 | 3.6 |
| 2 | 3.6 | 3.1 | 3.2 | 3.5 |
| 3 | 3.3 | 2.9 | 3.0 | 3.4 |
| 4 | 3.1 | 2.8 | 2.9 | 3.3 |
| 5 | 2.8 | 2.7 | 2.8 | 3.2 |
| 6 | 2.6 | 2.6 | 2.7 | 3.1 |
| 8 | ¹2.2 | 2.5 | 2.5 | 2.9 |
| 10 | 2.0 | 2.3 | 2.5 | 2.8 |
| 12 | 1.8 | 2.1 | 2.4 | 2.4 |
| 14 | 1.6 | ¹2.0 | 2.3 | 3.5 |
| 16 | 1.5 | 1.9 | 2.1 | 2.4 |
| 18 | ²1.4 | 1.8 | 2.1 | 2.3 |
| 20 | 1.4 | 1.7 | ¹2.0 | 2.2 |
| 21 | 1.4 | 1.7 | 2.0 | 2.2 |
| 22 | 1.4 | ²1.6 | 1.9 | 2.1 |
| 23 | 1.4 | 1.6 | 1.9 | 2.1 |
| 24 | 1.4 | 1.6 | ²1.8 | ¹2.0 |
| 25 | 1.4 | 1.6 | 1.8 | 2.0 |
| 26 | 1.4 | 1.6 | 1.8 | 1.9 |
| 28 | 1.4 | 1.6 | 1.8 | 1.9 |
| 30 | 1.35 | 1.6 | 1.8 | ²1.8 |
| 35 | 1.35 | 1.6 | 1.8 | 1.8 |
| 40 | 1.35 | 1.55 | 1.7 | 8.8 |

¹ Residual moisture content of hull, when the amount of drying loss of rice grain by drying reached the limit (2.5%) where the rough rice grains produce checks or cracks.
² Residual moisture content of hull, in case drying of hull was suspended.

Experimental Example No. 2:

TABLE 2.—RESIDUAL MOISTURE CONTENT OF HULL OF ROUGH RICE

[Percent to weight of rough rice]

| Drying time (min.) | Drying air | | | |
|---|---|---|---|---|
| | 80° C. 6m.³/sec. ton | 60° C. 6m.³/sec. ton | 50° C. 6m.³/sec. ton | 40° C. 6m.³/sec. ton |
| 0 | 3.7 | 3.1 | 3.0 | 3.1 |
| 1 | 3.1 | 2.8 | 2.8 | 2.9 |
| 2 | 2.5 | 2.5 | 2.7 | 2.8 |
| 3 | ¹2.0 | 3.1 | 2.6 | 2.7 |
| 4 | 1.6 | 1.9 | 2.4 | 2.5 |
| 5 | 1.4 | 1.7 | 2.2 | 2.3 |
| 6 | 1.3 | ¹1.6 | 2.1 | 2.2 |
| 8 | 1.2 | 1.4 | 1.9 | 2.0 |
| 10 | 1.1 | 1.3 | 1.7 | 1.9 |
| 12 | ²1.0 | 1.3 | 1.6 | 1.7 |
| 14 | 1.0 | 1.2 | ¹1.5 | 1.6 |
| 16 | 1.0 | ²1.1 | 1.4 | 1.5 |
| 18 | 1.0 | 1.1 | ¹1.3 | ¹1.5 |
| 20 | 1.0 | 1.1 | 1.3 | 1.4 |
| 22 | | 1.1 | 1.3 | 1.4 |
| 24 | | 1.1 | 1.3 | ²1.3 |
| 26 | | 1.1 | 1.3 | 1.3 |
| 28 | | 1.1 | 1.3 | 1.3 |
| 30 | | 1.1 | 1.3 | 1.3 |

¹ Residual moisture content of hull, in case the amount of drying loss of rice grain by drying reached the limit (2.5%) where the rough rice grains produce checks or cracks.
² Residual moisture content of hull, in case drying of hull was suspended.

Experimental Example No. 3:

TABLE 3

| Drying time (min.) | Tempering time (min.) | Cracked rice grain, percent |
|---|---|---|
| 5 | 20 | 6.0 |
| 5 | 30 | 0.7 |
| 5 | 40 | 0.1 |

Note.—Drying air, at 50° C. at the amount of 4 m.³/sec. ton. Variety; Okayama-grown Nishikaze.

Experimental Example No. 4:

TABLE 4

| Drying time (min.) | Tempering time (min.) | Cracked rice grain, percent |
|---|---|---|
| 25 | 100 | 5.7 |
| 25 | 150 | 1.3 |
| 25 | 200 | 1.3 |

Note.—Drying air, at 45° C. at the amount of 4 m.³/sec. ton. Variety Okayama-grown Nishikaze It was confirmed from above-mentioned Examples 1 and 2 that in 3 to 5 minutes, the hulls begin to shown a phenomenon of being dried to a sufficient extent for dryness fraction by one drying operation. In practice, 3- to 5-minute hot air drying at below 80° C. can draw out too small an amount of moisture from the rough rice grains so that it is required to carry out repeated circulations through drying-temperature circuit, and also the grain elevator must be extremely enlarged, with resultant reduced practicality. For example, in an extreme case where the drying conditions are at 40° C. and 2.5 m.³/sec. ton as exemplified in Table 1 of Example 1, drying of hulls is ceased after 30 minutes of drying operation, on the other hand, where the drying conditions are at 80° C. and 10 m./sec. ton as shown in Table 2 of Example 2, drying of hulls stops 5 minutes after initiation of drying operation. However, the safety limit against checks or cracks of seed proper should be arrived at before drying of hulls is ceased, that is to say, before the equilibrium moisture content of hull is attained. Therefore, with consideration for safety limit against checks or cracks of seed proper, it may safely be said that the drying limit of hulls in one drying operation is at (¹)-marked position of said Tables 1 and 2. With the result of this, in the present specification the drying time is practically based on said (¹)-marked position. It was thus found from the results shown in Tables 1 and 2 that the optimum time for preferentially and sufficiently drying rough rice grains without producing cracks or checks in grain may be varied from about 3 to about 25 minutes according to temperature and amount of hot air used. As described above, unless drying is stopped before moisture in hull practically reaches the specified residual moisture content having the mark (¹) (drying loss of rough rice grain in one drying pass is 2.5%), there is a danger of producing cracks or checks in rough rice grain. It was also corroborated from the results in Examples 3 and 4 that by allowing about 5 times as long tempering time as the drying time, the ensuing drying tempering operations may be alternately and repeatedly conducted without hindrance.

The principal object of the present invention is to provide a circulated grain drying apparatus and operation wherein a grain-drying chamber is provided; in said grain-drying chamber rough rice grains are flowing downwardly at a speed as high as possible and, therefore, the grains are dried up to having such a moisture content that breakage of the rice grain may not be caused due to the drying operation; and a tempering tank is installed on said grain-drying chamber, with said tempering tank having a volume more than five times as large as the same of said grain-drying chamber.

One of the essential aims of the tempering operation is to cause the hull of rough rice to absorb moisture out from the seed proper thereof to such as extent that the rough rice may be successfully subjected to the next drying operation.

One embodiment of the present invention will be hereinafter described in detail with reference to the accompanying drawings wherein:

FIG. 2 is a schematic vertical sectional front view of FIG. 1.

Detailed description of embodiment

Figure 1:
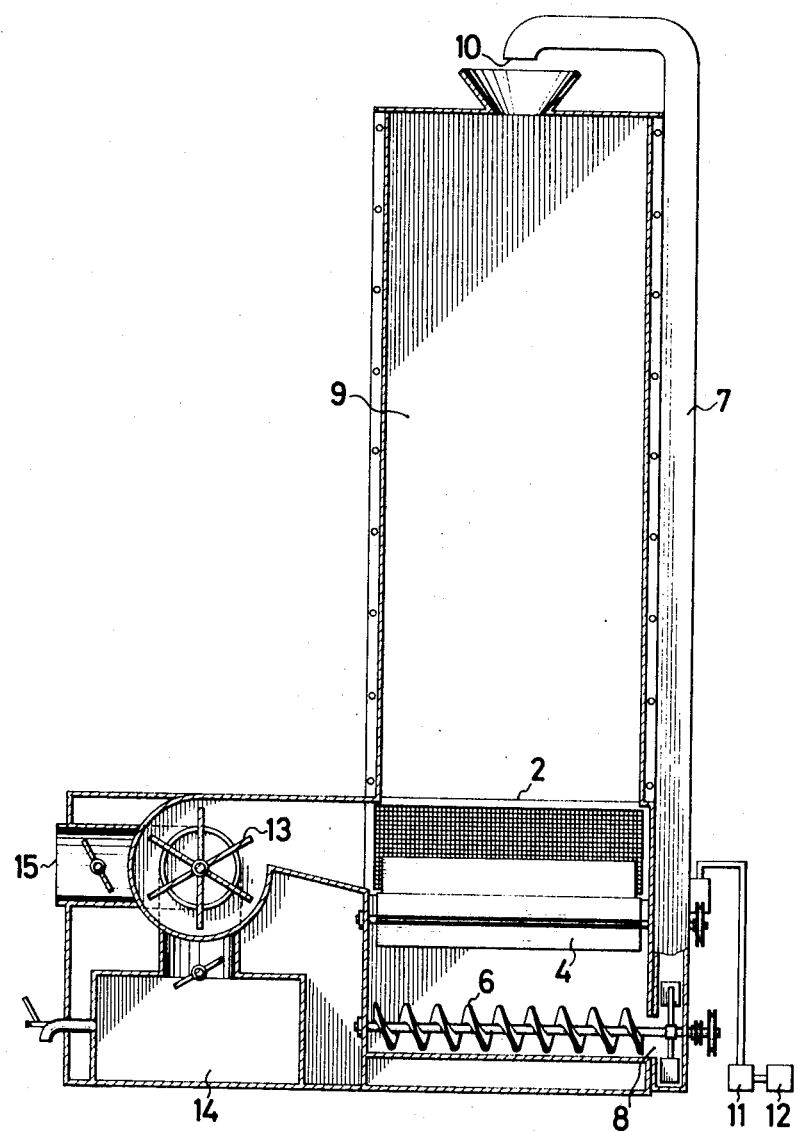
FIG. 1 is a schematic vertical sectional side view illustrating a circulated grain, drying apparatus according to the present invention.

In the attached drawings, numeral 1 designates a vertical-type grain-drying chamber in which the grain may flow through vertically downwardly. The grain-drying chamber 1 has an opening 2 at its upper side, and has side walls 3 formed from perforated plates so as to permit passage of air therethrough. The grain-drying chamber 1 is also provided with a heat source or furnace 14 and with a blower 13, said furnace being capable of supplying a hot air at 40° C. to 80° C. into drying chamber 1, and said blower 13 being capable of supplying air at a volume of more than 2 m.³/sec. (per 1 ton of rough rice grain) into the drying chamber. At a bottom of the grain-drying chamber 1 are provided discharge-regulators 4 each of which controls the flow rate of the grain in the drying chamber 1 so as to hold the grain for 3 to 25 minutes in the drying chamber 1. Below the discharge-regulators 4 is installed a V-shaped common trough 5 which has a horizontal rotatable screw conveyor 6 at a substantially middle bottom portion thereof. The grain-drying chamber 1 is integrally provided on the upper side thereof with a tempering tank 9 having a net volume of more than five times as large as the same of the grain-drying chamber 1. A grain elevator 7 is vertically arranged outside the grain-drying chamber 1 and the tempering tank 9, said grain elevator having a lower port or an inlet port 8 communicated with a discharge port of the V-shaped trough 5, and also having an upper port or outlet port 10. Furthermore, numeral 11 designates a timing mechanism, 12 designates an electric power source, and 15 designates an incoming air adjusting means.

With the grain-drying apparatus according to the present invention being arranged as described above, when the rough rice grain to be dried is supplied into the grain elevator 7 through a feed hopper (not shown), the same is elevated by the grain elevator 7 up to the outlet port 10 thereof. The elevated grain is then fed to the tempering tank 9 so as to flow by gravity downwardly through the tempering tank 9, and is deposited on the discharge-regulator 4 whereby the grain is filled in not only the grain-drying chamber 1 but the tempering tank 9. The tempering tank 9, as described heretofore, has the volume of more than five times as large as the same of the grain-drying chamber 1; according to circumstances, it is not uncommon that the tempering tank 9 has the volume of twenty times as large as the same of the grain-drying chamber 1. However, if the volume of said tempering tank 9 is just five times as large as the same of the grain-drying chamber 1, the grain drying apparatus of the present invention may not be effectively operated without filling up the tempering tank 9 with rough rice grain to be dried. As soon as the grain-feeding operation into the grain-drying chamber 1 and the tempering chamber 9 is completed, hot air at 40° C. to 80° C. moving at more than 2 m.³/sec., as described above, is supplied into the grain-drying chamber 1 and at the same time the discharge-regulators 4 are controlled by the operation of said timing mechanism 11 in such a manner that the grain passes through the grain-drying chamber 1 for about 3 min. to about 25 min. vertically, as described above. As the result of this operation, the grain after passing through the grain-drying chamber loses moisture content of about 1% to 2.5% from its hull by evaporation. The relatively dried grain is then received in the V-shaped trough 5, moved by the screw conveyor 6 toward the grain elevator 7, then conveyed back up to the tempering tank 9 by means of action of said grain elevator 7, and placed on the grain packed already in the tempering tank 9. Thus, it should be understood that if the above-said drying operation is continuously carried out, the relatively dried grain will be subjected to the second drying operation some time later. However, since the grain-drying chamber 1 and the tempering chamber 9 are commonly different to each other in their net volumes as described above, there is the interruption time of drying or the tempering time in proportion to the ratio of volumes of the drying chamber to the tempering tank before the next drying operation or the second drying operation begins, so that the hull of said relatively dried grain may suck moisture out from the seed proper thereof in such an extent that the grain will be successfully subjected to the second drying operation without causing breakage or sun-checking of the rice grain whereby equilibrium of moisture content in the rice is performed.

In other words, assuming that the ratio of volume of the grain-drying chamber 1 to volume of the tempering tank 9 is 1:5, the tempering time obtained results in 5 min.×5=25 min. The arrangement to obtain such tempering time is the essential technical idea of the present invention.

Where the drying apparatus according to the present invention rises to a height of over 4 to 5 meters, it is preferable that the tempering tank is detachably mounted on the grain-drying chamber.

According to the present invention, moreover, the timing mechanism is employed so that the drying extent of rough rice may be adequately controlled by an operator.

It will be understood that the grain-drying apparatus according to the present invention cannot demonstrate its effect when it is wanting in any one of three requisites of temperature of air, amount of air and drying time. Moreover, it is indispensable to its operation that the tempering tank has a volume of more than five times as large as the same of the grain-drying chamber to thereby provide the tempering time of more than five times as long as the drying time; and that rough rice grains are circulated repeatedly along a circuit comprising the grain-drying chamber and the tempering tank.

For example, even if the temperature of drying air is dropped to 35° C., it does not come up to inventor's expectation in which the hull of rough rice will be preferentially dried as soon as possible whereby the drying apparatus according to the present invention should lose its character.

Various rough rice dryers of tempering type have been invented since 1927, but all of these dryers have not resulted in a circulating grain, drying apparatus, as being the apparatus according to the present invention, which is simple in structure and reduced in its installation space, for the reason that the tempering-drying process has not been understood in substance. The grain-drying apparatus according to the present invention has been accomplished by combining rationally five requisites, namely, the temperature of drying air, the amount of drying air, the ratio of volumes of the grain-drying chamber to the tempering tank, the drying time in one pass and the circulation of grains, given based on the new definition on "tempering of grain" and various experiments or tests according to said new definition.

It will, of course, be understood that various changes may be made in the form, details, arrangement and parts without departing from the scope of the present invention which consists of the matter shown and described herein and set forth in the appended claims.

What I claim is:

1. A circulating grain drying apparatus comprising a vertical-type grain drying chamber means to feed hot air through said chamber at a temperature of about 40–80° C. and at a rate of about 2 m.³/sec./ton of rough rice, said hot air feeding means including air heating means and blower means; grain discharge means at the bottom of said chamber, and means to control said discharge means to maintain grain within said chamber for 3–25 min.; means to permit moisture to migrate from the wet grain interior to the grain hull comprising a tempering tank mounted upon and communicating with said drying chamber, said tank having a volume of more than 5 times as great as the volume of said chamber; and means to recirculate partially dried and uncracked grain from said grain discharge means to the top of said tempering tank, said recirculating means comprising a grain elevator having a lower part in communication to the upper end of said tempering tank.

2. A circulating grain drying apparatus according to claim 1, wherein said tempering tank is detachably mounted on said grain-drying chamber.

3. A circulating grain drying apparatus according to claim 1, wherein said control means comprises a timing mechanism.

4. A method of drying rough rice comprising passing rough rice vertically through a drying chamber through which air is simultaneously passed at a temperature of about 40° C. to about 80° C. at a volume of more than about 2 m.³/sec. per ton of rough rice, regulating the speed of passage of the rough rice through the drying chamber to hold the grain for 3 to 25 minutes in the drying chamber, removing the rough rice from the drying chamber and passing it to a tempering tank communicating with the drying chamber so that the rough rice automatically passes from the tempering tank back to the drying chamber, the speed of passage of the rough rice through the tempering tank being at least 5 times the corresponding time in the drying chamber whereby the rough rice in passing through the drying chamber loses moisture content of about 1–2.5% from its hull by evaporation and during the pass through the tempering tank moisture is absorbed from the seed proper to the hull of the rough rice grain.

References Cited

UNITED STATES PATENTS

| | | | |
|---|---|---|---|
| 625,358 | 5/1899 | Schock | 34—102 X |
| 2,732,630 | 1/1956 | Markowich | 34—174 |
| 2,766,534 | 10/1956 | Schaub et al. | 34—33 |
| 3,426,442 | 2/1969 | Satake | 34—102 |

LLOYD L. KING, Primary Examiner

U.S. Cl. X.R.

34—102, 167, 174